(12) United States Patent
McClary

(10) Patent No.: US 6,510,166 B2
(45) Date of Patent: Jan. 21, 2003

(54) STUFFING FILTER MECHANISM FOR DATA TRANSMISSION SIGNALS

(75) Inventor: Michael McClary, Newark, CA (US)

(73) Assignee: Redback Networks, Inc., San Jose, CA (US)

( * ) Notice: Subject to any disclaimer, the term of this patent is extended or adjusted under 35 U.S.C. 154(b) by 0 days.

(21) Appl. No.: 09/836,950

(22) Filed: Apr. 17, 2001

(65) Prior Publication Data

US 2002/0150057 A1 Oct. 17, 2002

Related U.S. Application Data

(60) Provisional application No. 60/280,662, filed on Mar. 31, 2001.

(51) Int. Cl.[7] .................................................. H04J 3/07
(52) U.S. Cl. ........................................ 370/505; 370/506
(58) Field of Search ........................ 370/351, 357–359, 370/360–388, 464–9, 498–506, 516, 538–541

(56) References Cited

U.S. PATENT DOCUMENTS

| | | | |
|---|---|---|---|
| 4,667,324 A | | 5/1987 | Graves |
| 4,736,363 A | | 4/1988 | Aubin et al. |
| 5,159,595 A | | 10/1992 | Flanagan et al. |
| 5,268,936 A | * | 12/1993 | Bernardy .................... 327/231 |
| 5,400,369 A | | 3/1995 | Ikemura |
| 5,511,077 A | * | 4/1996 | Shimada ..................... 370/505 |
| 5,608,733 A | | 3/1997 | Vallee et al. |
| 5,621,773 A | | 4/1997 | Varma et al. |
| 5,825,770 A | * | 10/1998 | Coady et al. ................ 370/378 |
| 5,963,564 A | | 10/1999 | Petersen et al. |
| 6,205,142 B1 | | 3/2001 | Vallee |

FOREIGN PATENT DOCUMENTS

| | | |
|---|---|---|
| WO | PCT/US02/05088 | 6/2002 |
| WO | PCT/US02/04603 | 7/2002 |

OTHER PUBLICATIONS

"Analysis of Techniques for the Reduction of Jitter Caused by SONET Pointer Adjustments", IEEE 1994, Kusyk, Krzymien and Moore.*

P.K. JHA, "Bandwidth Maximization for SONET/SDH and Direct Data over Optical Networks," http://www.isoc.org/inet2000/cdproceedings/1g/1g_3.htm, pp. 1–26, Nov. 16, 2000.

* cited by examiner

Primary Examiner—Salvatore Cangialosi
(74) Attorney, Agent, or Firm—Blakely Sokoloff Taylor & Zafman

(57) ABSTRACT

A method and apparatus for performing bit stuffing operations for transmission signals are described. In an embodiment, a method includes receiving data for a number of channels of a signal. The method also includes recursively processing the data for the number of channels in an order. The processing of a channel of the number of channels includes retrieving a previous state for the channel upon determining that a timeslot for the channel is being processed. The previous state includes a history of values of a depth of a First In First Out (FIFO) for the channel. Moreover, the processing of the channel of the number of channels within the signal includes determining whether to make a bit stuffing decision for the channel upon determining whether the timeslot is associated with a bit stuffing opportunity for the channel. The bit stuffing decision is based on a current value and the history of the values of the depth of the FIFO for the channel. The method also includes updating a current state for the channel of the number of channels. Moreover, the current state for the channel of the number of channels within the signal is stored as the previous state for the channel.

41 Claims, 7 Drawing Sheets

STUFFING FILTER MECHANISM FOR DATA TRANSMISSION SIGNALS

RELATED APPLICATIONS

This is a continuation of U.S. Provisional Patent Application Serial No. 60/280,662, entitled "Stuffing Filter Mechanism for Data Transmission Signals" filed Mar. 31, 2001 now abandoned.

FIELD OF THE INVENTION

The invention related to the field of telecommunications. More specifically the invention relates to a stuffing filter mechanism for data transmission signals.

BACKGROUND OF THE INVENTION

With the advent of the Internet and the World Wide Web (WWW), the need for high-speed transmission of data including video and audio has continued to increase. Moreover, in addition to the demand for higher bandwidth, there has also been an increased need for various types of services that employ different protocols. For example, certain customers (e.g., companies providing voice services) of high-speed networks want to operate on a Time Division Multiplexing (TDM) Network, which combines different data streams, such as voice traffic, such that each data stream is assigned a time slot within the combined data stream. Moreover, other customers of high-speed networks may desire to transport data employing packet-based data streams, which do not have dedicated timeslots to given packets. Examples of the types of packets that can be placed into such data streams can include Asynchronous Transfer Mode (ATM), Internet Protocol (IP), Frame Relay, voice over IP and Point-to-Point Protocol (PPP).

Typically, such data transmission systems incorporate a larger number of data streams together into a single data stream to employ a greater percentage of the bandwidth of the transmission lines being employed. For example, under current data transmission standards 28 Data Signals (DS)1s are incorporated to form a DS3, thereby forming one signal that includes a number of smaller signals therein. Different network elements within these data transmission systems will break down such DS3 signals to extract all or a portion of the DS1 signals contained therein. Accordingly, these network elements can repackage the extracted DS1 signals with other DS1 signals to form other DS3 signals for subsequent transmission in the network. Further, such DS1 signals can be extracted to allow for the processing of the payload contained therein. For example, if a given DS1 signal may be carrying IP packets in the payload. These IP packets can be extracted from the payload and forwarded to their intended destination based on forwarding tables.

Currently, the bit rate of DS1 signals meets tight requirements of both the average bit rate and the bit-to-bit timing variations, known as "jitter." However, the bit rate of the DS3 signal in which the DS1 signals are embedded is not required to meet such tight standards. Moreover, the bit rate of the DS3 signal is not required to have a close relationship to that of the DS1 signals it contains. Instead, bit rate variations between each DS1 signal and the containing DS3 signal are accommodated by "bit stuffing."

As the DS1s are packed into the DS2s (which will be further packed to form the DS3), the DS2 data format provides occasional opportunities to make a decision to send a data bit or a "nonsense" bit (called a "stuff bit"). Stuff bits are discarded when the DS1 is eventually unpacked by the receiving network element, thereby leaving the data bits of the DS1 signal. Moreover, typically, the incoming data bits will be placed into a First In First Out (FIFO) (i.e., an elastic store) of the network element as they arrive and are extracted from the FIFO as the time to send the data bits occurs. At a time a decision to send a data bit or a stuff bit occurs, such a decision can be made on the basis of the number of data bits in the FIFO. A typical approach is to transmit data bits when the FIFO is greater than halfway full and to transmit a stuff bit if the FIFO is less or halfway full.

Due to such factors as the stuffing and destuffing steps, the layout of the data bits in the data formats and the jitter on the transmission path, the data bits that are unpacked from a DS3 often times arrive at a rate that is not smooth and/or constant.

One current technique to smooth out this DS1 bit rate is to employ phase lock loop analog circuitry. Such circuitry provides for a clock recovery that follows the average rate for a given transmission signal through the generation of a fresh clock from feedback circuitry based on the bit rate of the incoming DS1 signals. Moreover, the feedback circuitry can be based on the depth of the First In First Out (FIFO) containing extracted bits from the DS1 signal. With regard to the feedback circuitry based on the FIFO depth, the phase lock loop analog circuitry attempts to keep the FIFO approximately one-half full. Therefore, when the number of bits within the FIFO is greater than one-half, the rate is increased, and when the number of bits within the FIFO is less than one-half, the rate is decreased. While such analog circuitry allows a smooth egress rate, such circuitry is required to run continuously to allow for accurate calculations by the circuitry.

Moreover, the real estate that this analog circuitry would encompass is very expensive. In particular, a given traffic or line card within network elements in high speed networks are processing a large amount of data on a large number of channels, wherein each channel is associated with a different DS1 signal. Therefore, this phase lock loop analog circuitry would need to be replicated for each channel that a given line card processes. Line cards can currently process close to 700 channels, thereby requiring close to 700 phase lock loop analog circuits in order to allow for the continuous updating of the egress rate. Moreover, the demand for the number of such channels that line cards can process will continue to increase in the future, thereby increasing the amount of real estate on the line cards needed for phase lock loop analog circuitry.

Another conventional approach to smooth out this egress rate would be to provide digital circuitry that approximates the above described phase lock loop analog circuitry. However, in order to provide this smoothing out for each of the channels being received, such digital circuitry would need to run several times faster than the rate of a given channel. If a given channel is a DS1 signal, which has a rate of approximately 1.5 Megabits/second, this digital circuitry would need to be running as high as 8, 16 or 32 times such rate.

Smoothing, in some form, is necessary when a network element that extracts the DS1 signal must output this signal as a smooth, regular bit stream. If the DS1 signal is to be terminated and have its payload extracted within the network element, which extracted the DS1 from the DS3 signal, smoothing can, at times, be dispensed. However, in some network elements, a DS3 signal may be disassembled so that some or all of its component DS1s can be reassembled into a new DS3 signal for further transmission.

A current approach is to smooth the data rate of each extracted DS1 and then repack the DS1 into the DS3 signal as if the DS1 had arrived within the network element with a smooth, regular bit timing. Another approach would be to attempt to eliminate the smoothing step by combining the arrival and departure FIFOs, thereby making the stuffing decisions without first smoothing the bit arrival times for the DS1s. Unfortunately, without some smoothing, the timing irregularities accumulate with each unpack/repack step. Accordingly, the bit arrival times eventually become too irregular to meet network standards. Therefore, current techniques smooth the bit arrival times of the DS1s as they are unpacked from and repacked into DS3 signals.

Accordingly, there is a need to provide a mechanism and technique to smooth out the data rate of a large number of DS1 signals being packed into and/or extracted from a number of DS3 signals within network elements of high-speed communications networks.

SUMMARY OF THE INVENTION

A method and apparatus for performing bit stuffing operations for transmission signals are described. In an embodiment, a method includes receiving data for a number of channels of a signal. The method also includes recursively processing the data for the number of channels in an order. The processing of a channel of the number of channels includes retrieving a previous state for the channel upon determining that a timeslot for the channel is being processed. The previous state includes a history of values of a depth of a First In First Out (FIFO) for the channel. Moreover, the processing of the channel of the number of channels within the signal includes determining whether to make a bit stuffing decision for the channel upon determining whether the timeslot is associated with a bit stuffing opportunity for the channel. The bit stuffing decision is based on a current value and the history of the values of the depth of the FIFO for the channel. The method also includes updating a current state for the channel of the number of channels. Moreover, the current state for the channel of the number of channels within the signal is stored as the previous state for the channel.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given element in a Figure is associated with the number of the Figure. For example, system 100 can be located in FIG. 1. However, element numbers are the same for those elements that are the same across different Figures.

In the drawings.

DETAILED DESCRIPTION

A method and apparatus for performing bit stuffing operations for transmission signals are described. In the following description, for purposes of explanation, numerous specific details are set forth in order to provide a thorough understanding of the present invention. Additionally, embodiments of the present invention are described in terms of signals based on the DS-1, DS-2 and DS-3. This is by way of example and not by way of limitation, as embodiments of the present invention can operate on any other types of data streams requiring the bit stuffing operations described below for smooth output rates (e.g., E1 and E3 standards). It will be evident, however, to one skilled in the art that the present invention may be practiced without these specific details.

System Description

Figure 1:
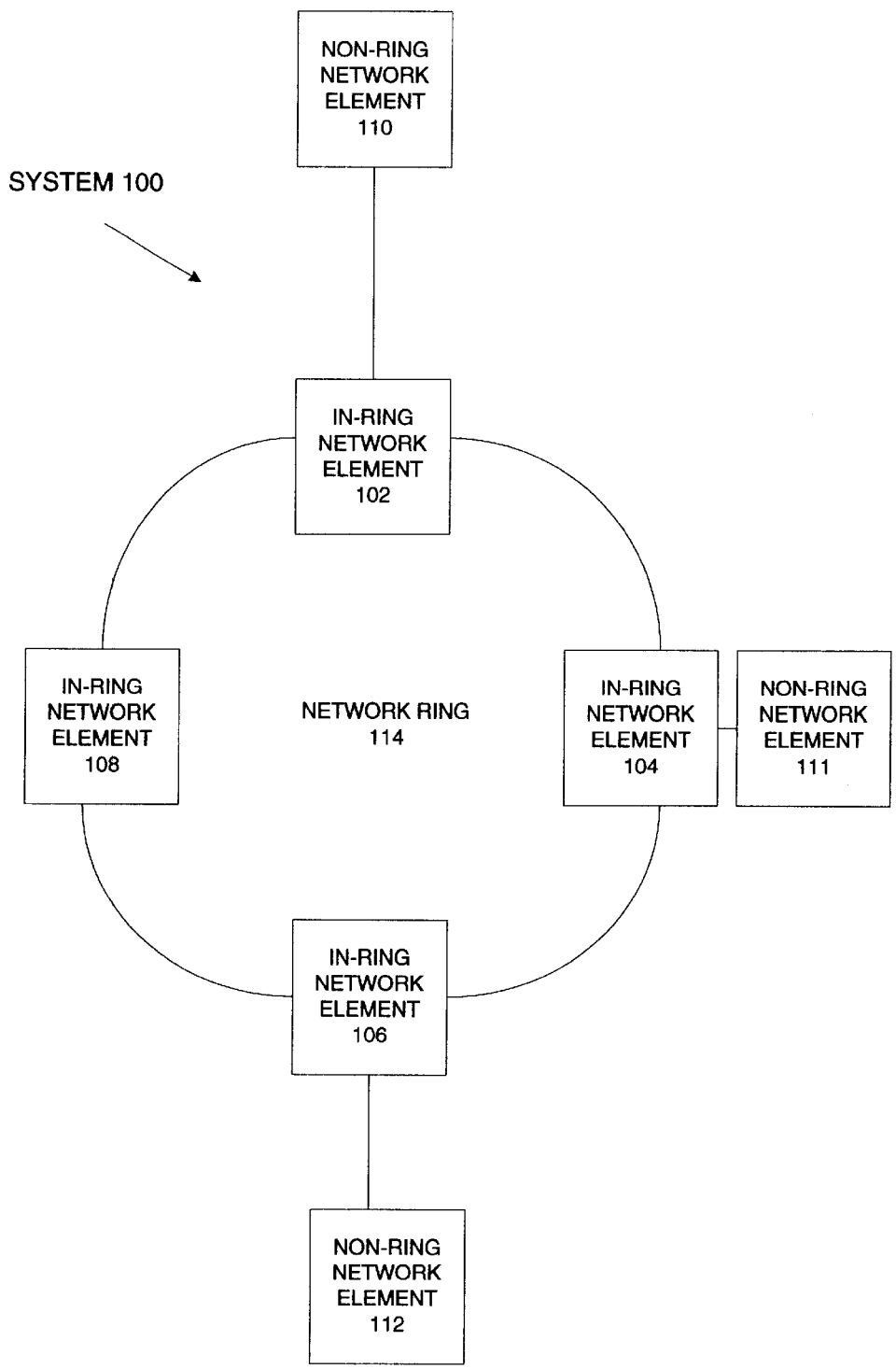
FIG. 1 is block diagram illustrating a system that incorporates embodiments of the present invention.

FIG. 1 is block diagram illustrating a system that incorporates embodiments of the present invention. In particular, FIG. 1 illustrates system 100 that includes network ring 114, which is comprised of in-ring network element 102, in-ring network element 104, in-ring network element 106 and in-ring network element 108. System 100 also include non-ring network element 110, non-ring element 111 and non-ring network element 112, which are coupled to network ring 114 through in-ring network element 102, in-ring network element 104 and in-ring network element 106, respectively. In an embodiment, non-ring elements 110–112 can be routers, switches, bridges or other types of network element that switch data across a network.

In one embodiment, the connection among in-ring network element 102, in-ring network element 104, in-ring network element 106 and in-ring network element 108 allow for bidirectional traffic. Accordingly, this bi-directional capability allows for redundancy in the communication between the different network elements, such that if a given line of communication is lost, the data traffic to be transmitted thereon can be rerouted in the opposite direction to reach its intended destination within the ring architecture.

In an embodiment, system 100 transmits data traffic among the different network elements, both in-ring and non-ring, employing the Synchronous Optical Network (SONET) standard or Synchronous Digital Hierarchy (SDH). However, embodiments of the present invention are not so limited, as data traffic among the different network elements can be transferred using other types of transmission standards. Examples of other types of transmission standards can include, but are not limited to, T1, T3, Data Signal (DS)3 and DS1 signals. In one embodiment, data traffic among in-ring network element 102, in-ring network element 104, in-ring network element 106 and in-ring network element 108 includes TDM traffic and packet traffic within a same Time Division Multiplexing (TDM) signal.

In this ring network, network elements are used that can transmit and receive TDM ring traffic. In addition, at least certain of the network elements provide two different switching techniques—TDM and packet. The packet switching provided can support any number of protocols including layer 2 and layer 3 type protocols such as ATM, Ethernet, Frame Relay, etc. In addition to typical operations of a TDM network element, the network elements are implemented to be able to: 1) programmably select on an STS basis certain of the incoming TDM traffic to be extracted and packet switched rather than TDM switched; and/or 2) receive packet traffic in another form and to be packet switched. Regardless of which switching technique is used, the switched traffic going back onto the ring is put in TDM format and transmitted out. However, each time traffic is packet switched, that traffic can be statistically multiplexed (e.g., the packets can be selectively dropped based on various criteria). A further description of the operation of system 100 and the network elements therein is described in more detail below.

The architecture and configuration of system 100 is by way of example and not by way of limitation, as embodiments of the present invention can be incorporated in other types of systems. For example, other such systems could incorporate less or more network elements into the network ring and/or network elements attached thereto. Moreover, embodiments of the present invention are not limited to the network ring architecture as illustrated in FIG. 1. Examples of other types of network architectures that can incorporate embodiments of the present invention include, but are not limited to, a point-to-point configuration, point-to-multipoint configuration and/or a hub configuration. In addition, embodiments of the present invention are not limited to TDM networks, but also applies to Wave Division Multiplexing (WDM) networks.

Network Element Description

Figure 2:
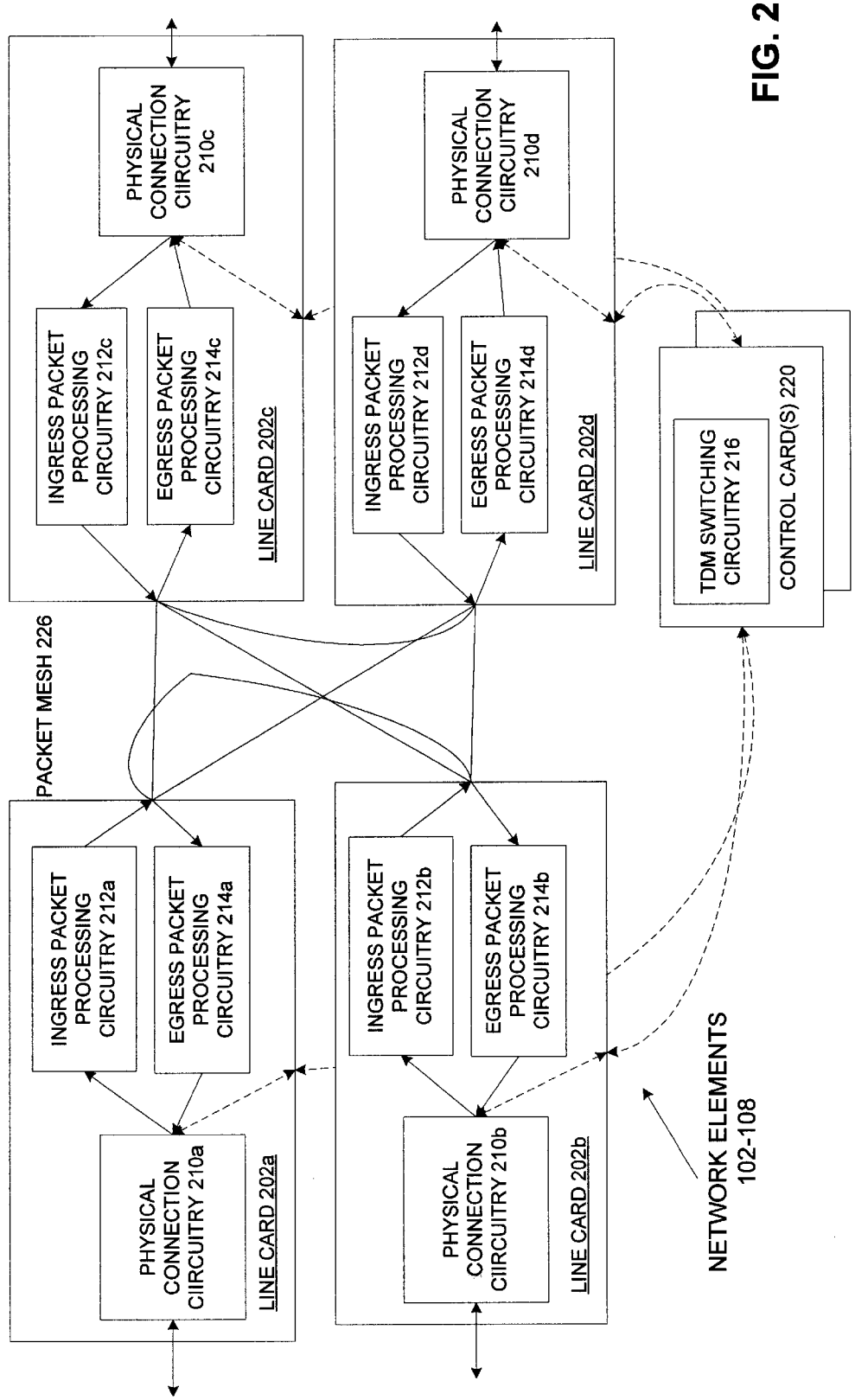
FIG. 2 illustrates portions of in-ring network elements 102–108, according to embodiments of the present invention.

FIG. 2 illustrates portions of in-ring network elements 102–108 (for purposes of FIG. 2, hereinafter "network element 102"), according to embodiments of the present invention. As shown, network element 102 includes line cards 202a–d and control card(s) 220, such that control card(s) 220 are coupled to each of line cards 202a–d. The number of line cards illustrated are for the sake of simplicity and not by way of limitation, as a lesser or greater number of line cards can be included within network element 102. Additionally, network element 102 includes a first switch fabric, packet mesh 226, which includes a full mesh such that each of line cards 202a–d are coupled to one another. For example, line card 202a is coupled to line cards 202b–d through packet mesh 226. However, embodiments of the present invention are not limited to a full mesh for the transmission of packets among line cards 202a–d, as any type of switching method that switches based on the addressing scheme described herein can be incorporated into embodiments of the present invention. For example, in one embodiment, line cards 202a–d could be coupled together using a switch fabric, such that the line cards are coupled to a control card, which provides for the switching therein.

Line cards 202a–d include physical connection circuitry 210a–d, ingress packet processing circuitry 212a–d and egress packet processing 214a–d, respectively. Physical connection circuitry 210a–d can be coupled to lines external to network element 102, as shown, which can carry optical and/or electrical signals. In one embodiment, line cards 202a–d of network element 102 may be connected to an optical line transmitting SONET OC-N signals. Moreover, in an embodiment, line cards 202a–d of network element 102 may be connected to an electrical line such as a T1, T3, E1, E3, Ethernet, Gigabit Ethernet, etc. However, embodiments of the present invention are not limited to the above-described examples, as any other type of optical or electrical data transmission can be incorporated into embodiments of the present invention. Additionally, control cards(s) 220 include TDM switching circuitry 216.

In an embodiment, each line card 202a–d can be coupled to four optical and/or electrical lines. In another embodiment, each line card 202a–d can be coupled to eight optical and/or electrical lines. However, embodiments of the present invention are not so limited, as a lesser or greater number of optical and/or electrical lines can be coupled to network element 102 through line cards 202a–d. Additionally, physical connection circuitry 210a–d are coupled to ingress packet processing circuitry 212a–d, respectively, such that packet data being received from the optical and/or electrical lines is passed from physical connection circuitry 210a–d to ingress packet processing circuitry 212a–d, respectively. In one embodiment, the packet data is extracted from a TDM signal, which is described in more detail below.

Ingress packet processing circuitry 212a–d is coupled to packet mesh 226. Accordingly, each ingress packet processing circuitry 212a–d is coupled to each egress packet processing circuitry 214a–d, respectively, on other line cards 202a–d through packet mesh 226. Moreover, egress packet processing circuitry 214a–d is respectively coupled to physical connection circuitry 210a–d, such that packet data traffic coming in from packet mesh 226 from ingress packet processing circuitry 212a–d is transmitted from egress packet processing circuitry 214a–d to physical connection circuitry 210a–d, respectively.

Line cards incorporated into embodiments of the present invention are not limited to those illustrated by line cards 202a–d. Moreover, the network elements can have different line card configurations from that shown by line cards 202a–d. For example, a given in-ring network element could be limited to a single line card that can receive and transmit TDM traffic(which may include packet traffic) within network ring 114, employing multiple interfaces for the receipt and transmittal of TDM traffic. In another embodiment, a given in-ring network element can include a first line card to receive TDM traffic (which may include packet traffic) from another in-ring network element, while a second line card can transmit TDM traffic to another or same in-ring network element. In one such embodiment, a third line card can be incorporated into this given in-ring network element to add, drop and transmit different types of traffic including different types of packet traffic, such as ATM, Frame Relay, IP, etc, received and transmitted to a non-ring network element. In another embodiment, a given network element may include a single line card with multiple interfaces such that a first interface receives TDM traffic from another in-ring network element, a second interface transmits TDM traffic to another in-ring network element and a third interface adds, drops and transmits traffic, such as packet traffic to a non-ring network element.

Accordingly, a line card is used either to connect to an in-ring network element to form part of the ring, or to provide communication with out-of ring network elements. To provide some examples with regard to a line card connected with an out-of-ring network element: 1) layer 2/3 traffic from out-of-ring network element can come in, go through the packet mesh to a line card connected to an in-ring network element, and then out onto the ring being carried by a SONET frame; 2) layer 2/3 traffic coming from an out-of-ring network element can be de-mapped into SONET, go through the TDM switch fabric to a line card connected to an in-ring network element, and then out onto the ring being carried by a SONET frame; 3) TDM traffic coming from an out-of-ring network element can come in, go through the TDM switch fabric to a line card connected to an in-ring network element, and then out onto the ring being carried by a SONET frame; 4) TDM traffic carrying layer 2/3 traffic can be processed to extract the layer 2/3 traffic, with the layer 2/3 traffic going through the packet mesh to a line card connected to an in-ring network element, and then out onto the ring carried by a SONET frame; layer 2/3 traffic coming form an out-of-ring network element can go through the packet mesh to an line card connected to an out-of-ring network element, and then go out of the ring being carried by the protocol of the interface of that egress line card; etc.

With regard to the TDM traffic, a second switch fabric (in addition to packet mesh 226) is formed among line cards 202a–d and TDM switching circuitry 216 of control cards 220, as illustrated by the dashed lines in FIG. 2. In particular, physical connection circuitry 210a–d is coupled to TDM switching circuitry 216 for the receiving and transmitting of TDM traffic into and out of network element 102. Accordingly, TDM switching circuitry 216 receive TDM traffic from physical connection circuitry 210a–d and switches this traffic to any of physical connection circuitry 210a–d, based on configuration data for the timeslots of the TDM traffic. For example, TDM switching circuitry 216 could be configured such that data within the first ten timeslots of a TDM signal, such as a SONET/SDH signal, received on a first interface of physical connection circuitry 210a are forwarded out the first five timeslots of a TDM signal being transmitted out from a first interface of physical connection circuitry 210d.

Physical Connection Circuitry 210

Figure 3:
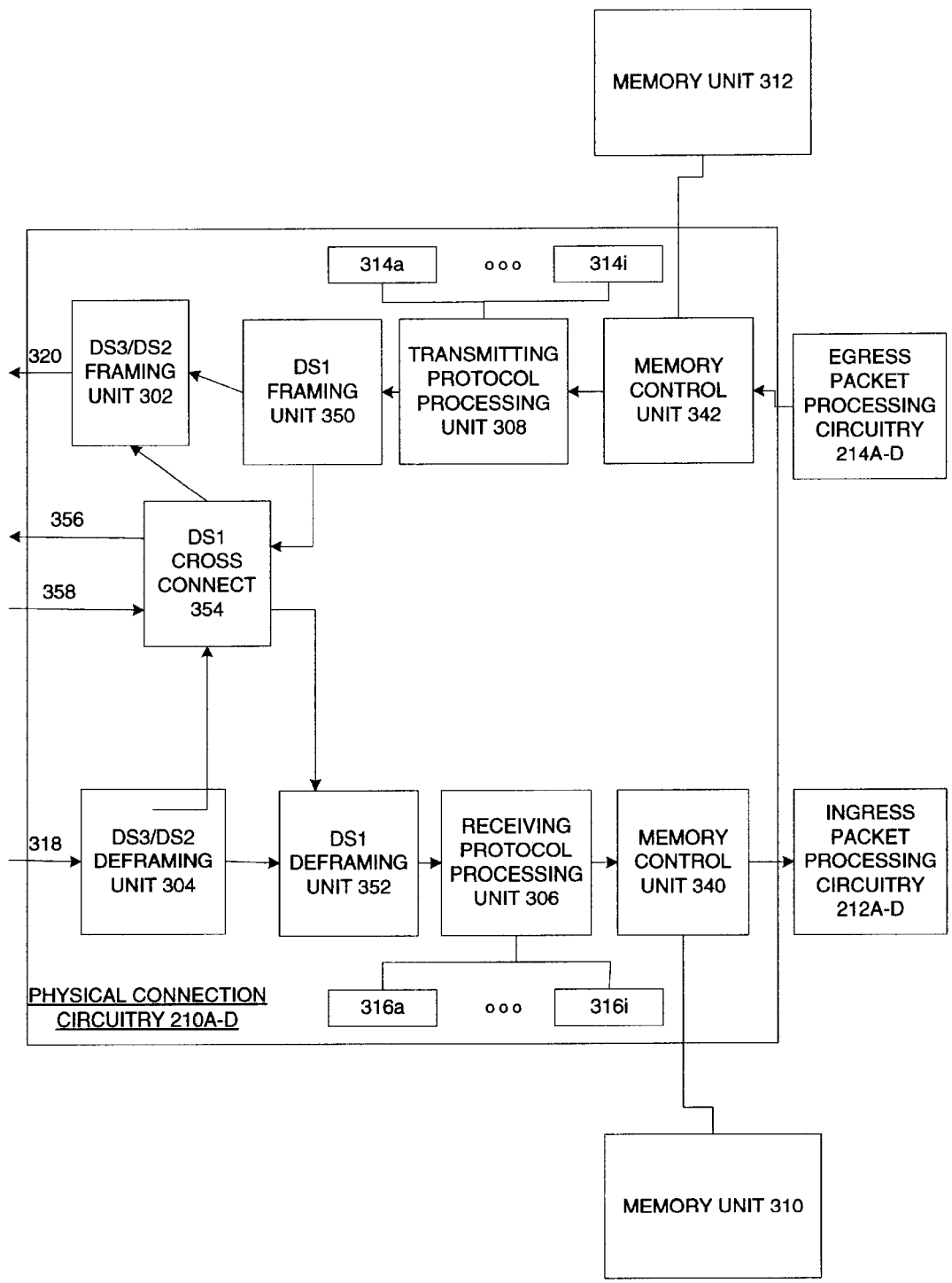
FIG. 3 is a block diagram of physical connection circuitry 210*a*–*d*, according to embodiments of the present invention.

FIG. 3 is a more detailed block diagram of physical connection circuitry 210a–d, according to embodiments of the present invention. In particular, physical connection circuitry 210a–d (hereinafter physical connection circuitry 210) includes DS3/DS2 deframing unit 304 that receives signal 318. In an embodiment, signal 318 includes a DS3 signal. However, embodiments of the present invention are not so limited, as other types of TDM signals can be received by DS3/DS2 deframing unit 304. DS3/DS2 deframing unit 304 is coupled to DS1 cross connect 354 and DS1 deframing unit 352. Moreover, DS1 cross connect 354 is coupled to DS1 deframing unit 352. DS1 deframing unit 352 is coupled to receiving protocol processing unit 306, which is coupled to register arrays 316a–i and memory control unit 340. Memory control unit 340 is coupled to memory unit 310 and ingress packet processing circuitry 212a–d (hereinafter ingress packet processing circuitry 212). The locations of memory unit 310 and ingress packet processing circuitry 212 in reference to physical connection circuitry 210a–d are by way of example and not by way of limitation. For example, in another embodiment, memory unit 310 and/or ingress packet processing circuitry 212 can be within physical connection circuitry 210a–d.

Additionally, egress packet processing circuitry 214a–d (hereinafter egress packet processing circuitry 214) is coupled to memory control unit 342. Memory control unit 342 is coupled to memory unit 312 and transmitting protocol packet processing unit 308. Transmitting protocol processing unit 308 is coupled to register arrays 314a–i and DS1 framing unit 350. DS1 framing unit 350 is coupled to DS1 cross connect 354 and DS3/DS2 framing unit 302. DS3/DS2 framing unit 302 is coupled to signal 320. In an embodiment, signal 318 includes a DS3 signal. However, embodiments of the present invention are not so limited, as other types of TDM signals can be transmitted out from DS3/DS2 framing unit 302.

The locations of memory unit 312 and egress packet processing circuitry 214 in reference to physical connection circuitry 210a–d are by way of example and not by way of limitation. For example, in another embodiment, memory unit 312 and/or egress packet processing circuitry 214 can be within physical connection circuitry 210a–d.

DS1 cross connect 354 is also coupled to signals 356 and 358. In an embodiment, signals 356 and 358 include DS1 signals. However, embodiments of the present invention are not so limited, as other types of TDM signals can be transmitted out from and received into DS1 cross connect 354 through signals 356 and 358, respectively. In one embodiment, DS1 cross connect 354 can receive a number of DS1 signals and route such signals out through various output signal lines. For example, DS1 cross connect 354 can receive a number of DS1 signals from DS3/DS2 deframing unit 304 and receive a DS1 signal from signal 358 and transfer these DS1 signals out from physical connection circuitry 210a–d through DS3/DS2 framing unit 302. In a further example, DS1 cross connect 354 can receive a number of DS1 signals from DS3/DS2 deframing unit 304 along with a DS1 signal from signal 358 and transfer these DS1 signals to DS1 deframing unit 352 for subsequent packet processing by ingress packet processing circuitry 212.

Memory units 310 and 312 can be any type of read/write memory. In an embodiment, memory units 310 and 312 are random access memories (RAMs). In one such embodiment, memory units 310 and 312 can be static RAMS. Register arrays 314a–i and register arrays 316a–i are also any type of read/write memory. In one embodiment, register arrays 314a–i and register arrays 316a–i are registers.

Figure 4:
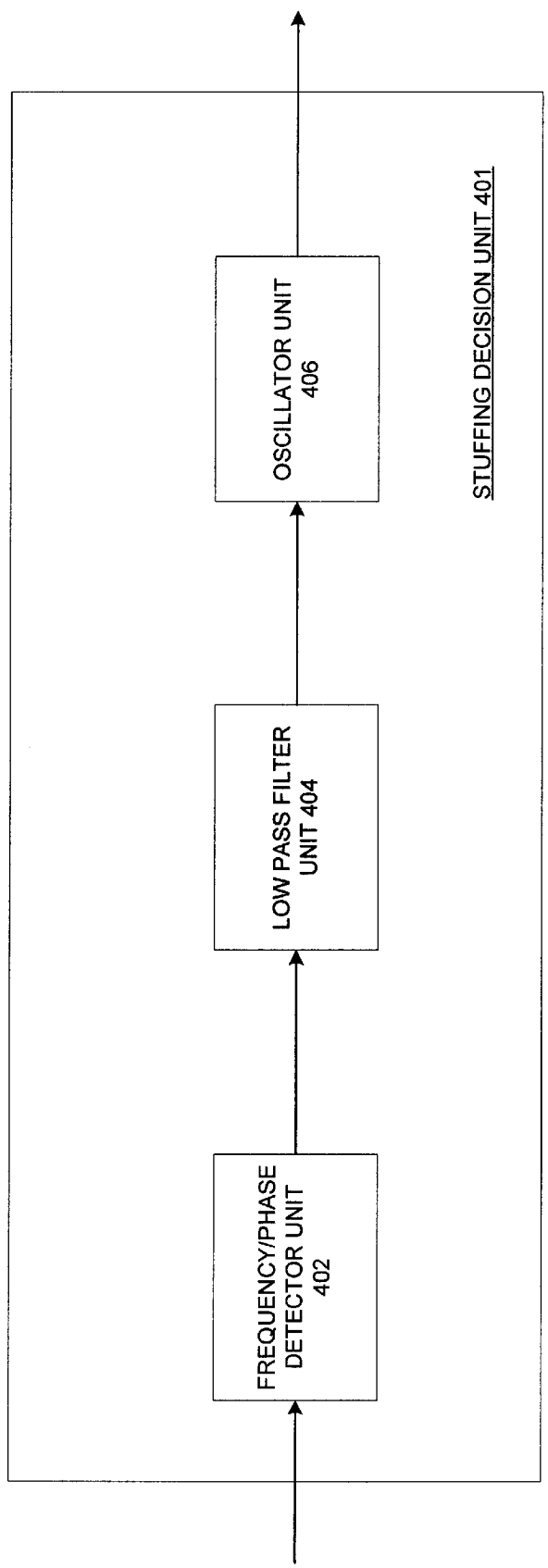
FIG. 4 illustrates bit stuffing circuitry contained in the input stage of DS3/DS2 framing unit 302, according to embodiments of the present invention.

FIG. 4 illustrates bit stuffing circuitry contained in the input stage of DS3/DS2 framing unit 302, according to embodiments of the present invention. In particular, FIG. 4 illustrates stuffing decision unit 401. In one embodiment, stuffing decision unit 401 determines whether to insert bits (i.e., perform bit stuffing) into the DS2 transmission signals being placed into the DS3 signals, which are transmitted out of signal 320. Stuffing decision unit 401 includes frequency/phase detector unit 402, which is coupled to receive input into stuffing decision unit 401. Additionally, the output from frequency/phase detector unit 402 is coupled to low pass filter unit 404. The output from low pass filter unit 404 is coupled to oscillator unit 406, which transmits the output from stuffing decision unit 401. The operations of frequency/phase detector unit 402, low pass filter unit 404 and oscillator unit 406 are known in the art. The location of stuffing decision unit 401 is by way of example and not by way of limitation, as stuffing decision unit 401 can be located outside of DS3/DS2 framing unit 302.

Processing of DS1 Channels

Figure 5:
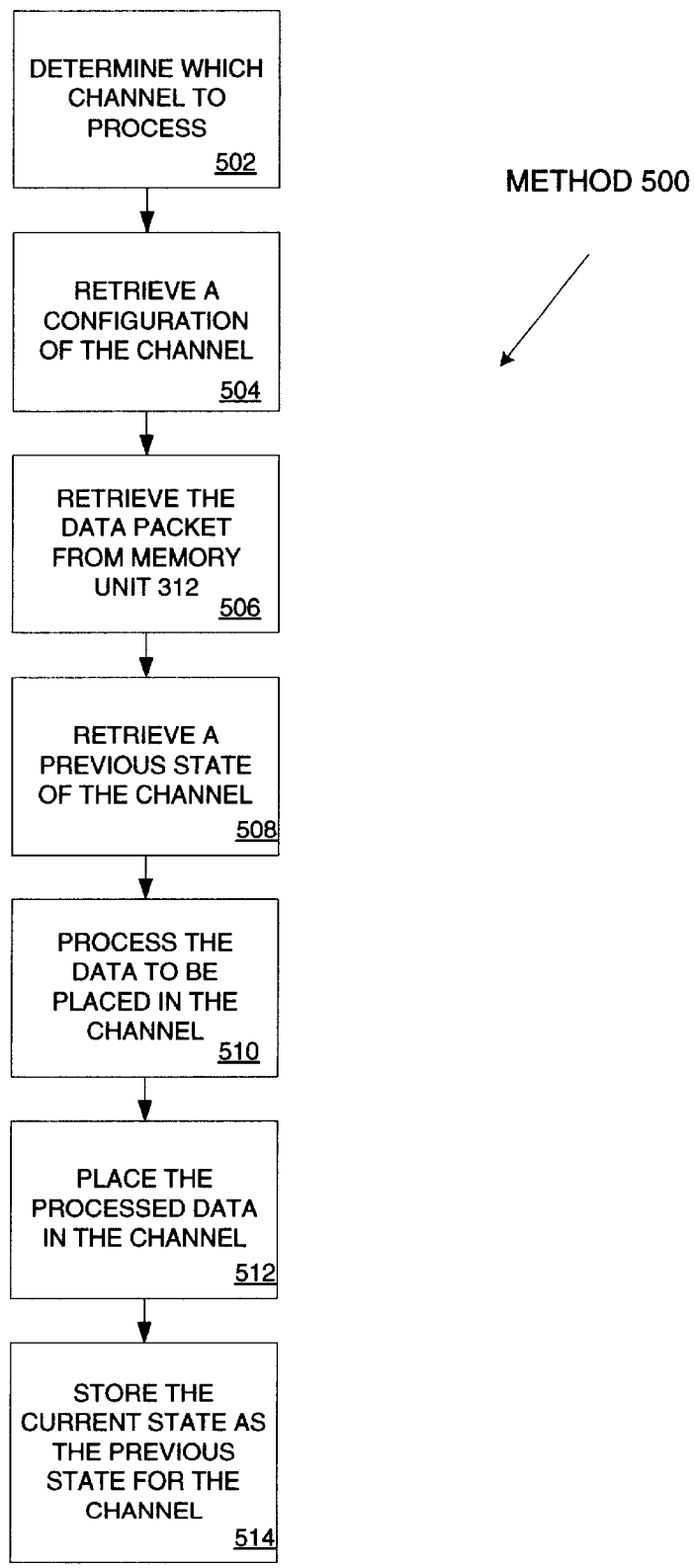
FIG. 5 illustrates a flowchart for the processing of DS3 signals by the receiving portion of physical connection circuitry 210, according to embodiments of the present invention.

The processing of the DS1 channels, including possible bit stuffing of such DS1 signals, for generation of DS2/DS3 signals (i.e., signal 320 of FIG. 3) will now be described in conjunction with FIG. 5. FIG. 5 illustrates a flowchart for the processing of data being transmitted out from a network element, according to embodiments of the present invention. In particular, FIG. 5 includes method 500 that illustrates the processing of data packets received by transmitting protocol processing unit 308, which are stored in memory unit 312, DS3/DS2 framing unit 302 and DS1 framing unit 350. In an embodiment, such data packets that are stored in memory unit 312 are being received from egress packet processing circuitry 214a–d. Method 500 commences with determining which channel of signal 320 is to be processed, at process block 502.

In an embodiment, transmitting protocol processing unit 308 determines which channel to process based on a table stored in memory within physical connection circuitry 210 (not shown). Such a table sets the order of traversal of the different channels of the signal being received by transmitting protocol processing unit 308. In another embodiment, transmitting protocol processing unit 308 determines which channel to process based on a prioritization scheme that can be configured by a system administrator of the given network element. In another embodiment, this prioritization scheme can be configured based on the channel having the highest bandwidth. In one embodiment, transmitting protocol processing unit 308 can dynamically order the processing of the different channels based on usage. In one embodiment, the channels are traversed in sequential order. In an embodiment, the order is an order of timeslots from each channel within an outgoing multiplexed bitstream. The above embodiments of the order of traversal are by way of example and not by way of limitation, as any other type of order of traversal of the channels may be incorporated into embodiments of the present invention.

As illustrated, transmitting protocol processing unit 308, DS3/DS2 framing unit 302 and DS1 framing unit 350 can service or process all of the channels prior to reservicing or reprocessing a channel again. Accordingly, transmitting protocol processing unit 308, DS3/DS2 framing unit 302 and DS1 framing unit 350 are operating at a frequency that is higher that the bandwidth of the transmitting signal in order to process all of the channels therein. In an embodiment, signal 320 can be 12 DS-3 signals, such that each DS-3 signal is operating at approximately 44.35 Megabits/second (Mbits/sec). Signal 320 is, therefore, operating at approximately 532.2. Megabits/second. In an embodiment, transmitting protocol processing unit 308, DS3/DS2 framing unit 302 and DS1 framing unit 350 are operating at a frequency higher than approximately 532.2 Mbits/sec. In one such embodiment, transmitting protocol processing unit 308, DS3/DS2 framing unit 302 and DS1 framing unit 350 are operating at approximately 800 Mbits/sec, which is higher than the operating frequency of 12 DS-3 signals.

Additionally, transmitting protocol processing unit 308, DS3/DS2 framing unit 302 and DS1 framing unit 350 retrieve the configuration for the selected channel, at process block 504. As described above, each channel can include a different configuration for a different and/or same protocol. For example, in an embodiment, a first channel can be an ATM protocol wherein ATM-type scrambling for the channel is enabled, while a second channel can also be a ATM protocol wherein a Larscom scrambling for the channel is enabled.

Moreover, transmitting protocol processing unit 308 retrieves at least a portion of a data packet that is to be transmitted on the selected channel, at process block 506. In one embodiment, for given protocols, transmitting protocol processing unit 308 delays the retrieval of portions of a data packet until a threshold amount of the entire data packet has been stored in memory unit 312. For example, for data packets having an ATM protocol, transmitting protocol processing unit 308 delays the retrieval of a portion of data for a given ATM cell until a threshold portion of the payload has been stored in memory unit 312 by egress packet processing circuitry 214*a–d*. Moreover, in an embodiment, if a given channel is based on the ATM protocol and the amount of data for the next ATM cell to be transmitted has not exceeded the threshold for this channel, transmitting protocol processing unit 308 forwards an idle ATM cell to framing unit 302.

In one embodiment, transmitting protocol processing unit 308 checks this threshold amount for the entire data packet for the first portion of the data packet being processed by transmitting protocol processing unit 308. However, embodiments of the present invention are not so limited, as certain data packets may contain multiple data cells, depending on the protocol and protocol configuration. For example, in an embodiment, a channel transmitting an ATM protocol may be transmitting a data packet that can contain more than a single ATM cell therein. In one such embodiment, transmitting protocol processing unit 308 checks if the threshold value for an ATM cell within a given data packet and not just the entire data packet for a given ATM cell has been reached prior to the transmission of the ATM cell to framing unit 302.

In one embodiment, each of the different protocols as well as each of the different channels of a same protocol can configure this threshold value. Embodiments of the present invention are not limited to the transmission of a idle cell if the data is not complete, as described in conjunction with the ATM protocol above. For example, in an embodiment of the voice over IP protocol, transmitting protocol processing unit 308 can retransmit the previous packet for the given channel. Additionally, in an embodiment, if a threshold value for a given protocol and protocol configuration has not been achieved but the completed packet has been stored in memory unit 312, transmitting protocol processing unit 308 proceeds with the processing of this packet to send to DS1 framing unit 350 and DS3/DS2 framing unit 302. Accordingly, this checking of threshold values by transmitting protocol processing unit 308 precludes underrunning, which is condition wherein transmitting protocol processing unit 308 does not have enough of a data packet to complete the transmission of the entire data packet to DS1 framing unit 350 and DS3/DS2 framing unit 302.

Moreover, upon determining which channel to process, transmitting protocol processing unit 308, DS1 framing unit 350 and DS3/DS2 framing unit 302 retrieve the previous state of this channel, at process block 508. In an embodiment, physical connection circuitry 210 includes a storage space associated with each channel within signal 320. Accordingly, in an embodiment wherein signal 320 includes 12 DS-3 signals, physical connection circuitry 210 includes storage space for 684 channels. In one such embodiment, these 684 channels can be for 336 DS-1 data channels and 348 control channels related to the 336 DS-1 data channels and 12 DS-3 data channels.

Returning to FIG. 3, in an embodiment, this storage space is provided by register arrays 314*a–i* such that each of these data arrays is associated with a channel within the signal being received. However, embodiments of the present invention are not so limited, as the previous state of the different channels can be stored in other configurations and/or other memory devices. For example, in another embodiment, the previous states for the different channels can be stored in one memory location on physical connection circuitry 210. Moreover, in another embodiment, the previous states for the different channels can be stored in a memory device external to physical connection circuitry 210.

Once the previous state for the selected channel has been retrieved, transmitting protocol processing unit 308, DS1 framing unit 350 and DS3/DS2 framing unit 302 process the data in the selected channel based on the previous state, at process block 510. In one embodiment, the processing of the data for this given channel includes encapsulating the data into a particular protocol, such as ATM, HDLC, or Voice over IP. Moreover, in an embodiment, the previous state includes whether the channel is enabled, the type of protocol as well as the configurations associated with this protocol for the given channel. For example, for the HDLC protocol, configurations could include whether to enable scrambling as well as the type of scrambling that is enabled (e.g., ATM type scrambling, Larscom scrambling, digital link, Kentrox, etc.).

In addition to processing the data in the given channel, transmitting protocol processing unit 308, DS1 framing unit 350 and DS3/DS2 framing unit 302 store the current state as the previous state for the processed channel within register arrays 314*a–i*, at process block 510. As described above, the current state can include a number of different bytes depending on the type of protocol and protocol configuration.

For the embodiment of physical connection circuitry 210 illustrated in FIG. 3, transmitting protocol processing unit 308 forwards this packet data to the framing unit 302, which places the packet data for the given channel into signal 320. The description of the different protocols and configurations are by way of example and not by way of limitation, as other types of protocols along with different configurations can be incorporated into embodiments of the present invention. For example, embodiments of the present invention can incorporate a Frame Relay protocol and various configurations thereof.

Figure 6:
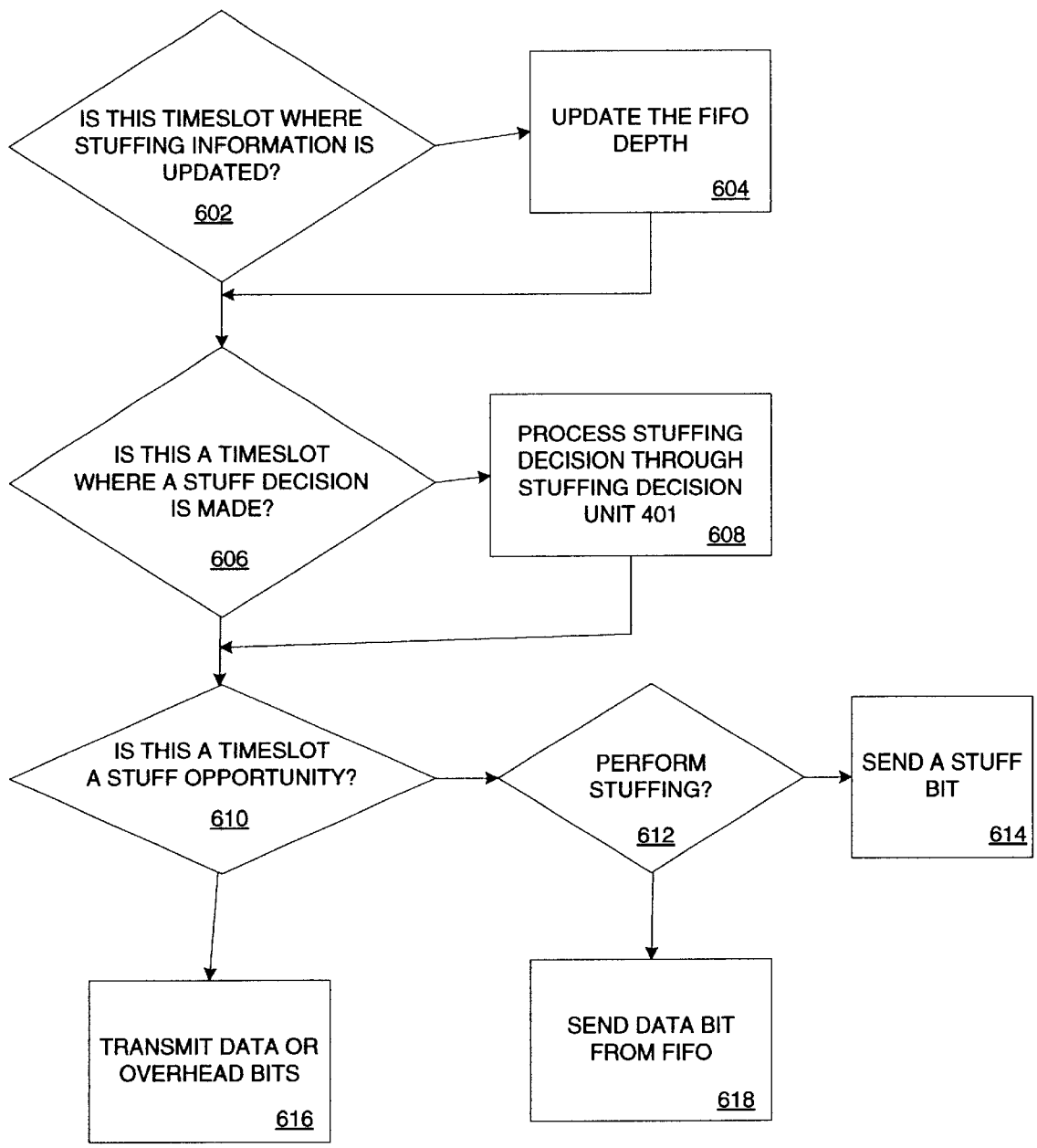
FIG. 6 illustrates a flowchart for the bit stuffing of a given DS1 signal within a channel, according to embodiments of the present invention.

The operation of the portions of DS3/DS2 framing unit 302 illustrated by FIG. 4 will now be described in conjunction with FIG. 6. FIG. 6 illustrates a flowchart for the bit stuffing of a given DS1 signal within a channel, according to embodiments of the present invention. In particular, the flowchart of FIG. 6 is a part of the processing of the data in the channel, shown in process block 510 of FIG. 5. DS3/DS2 framing unit 302 receives a timeslot for a given DS1 channel and determines whether this is a timeslot for this DS1 channel where stuffing information is updated, at process decision block 602. In an embodiment, this is a programmable decision. In one embodiment, this updating of stuffing information occurs for each timeslot for a given channel. However, embodiments of the present invention are not so limited. For example, in another embodiment, this update may occur every other timeslot for a given channel. Upon determining that the timeslot is one in which the stuffing information is updated, DS3/DS2 framing unit 302 measures the FIFO depth and updates the bit stuffing information based on this measured FIFO depth, at process block 604.

In an embodiment, the current state of the DS1 channel includes the current weighted average of the FIFO depth for this given DS1 channel. Stuffing decision unit 401 receives this data as input and determines whether to perform a bit stuffing operation using digital circuitry, as is known in the art. In particular, this input is received by low pass filter unit 404. In an embodiment, low pass filter unit 404 updates this current weighted average of the FIFO depth based on the current FIFO depth received from frequency/phase detector unit 402. Accordingly, in an embodiment, low pass filter unit 404 can generate an updated weighted average of the FIFO depth for this given DS1 channel, which can be stored as part of the current state for the DS1 channel within the associated register array 314*a–i*. Moreover, in an embodiment, based on the new weighted average of the FIFO depth, low pass filter unit 404 generates a smoothed value for the depth of the FIFO and passes this value to oscillator unit 406. Oscillator 406 determines whether to perform a bit stuffing operation or not. The operations of frequency/phase detector unit 402, low pass filter unit 404 and oscillator unit 406 are known in the art.

However, embodiments of the present invention are not limited to the current weighted average of the FIFO depth. In one embodiment, the value of the FIFO depth received from frequency/phase detector unit 402 is used by oscillator unit 406 to determine whether to perform a bit stuffing operation or not. In another embodiment, a history of the FIFO depth (which is not the weight average of the FIFO depth) received from the current state of the DS1 channel is used. In one such embodiment, different passbands for low pass filter unit 404 maybe received from the current state of the DS1 channel to determine a FIFO depth to be smoothed and transmitted to oscillator unit 406.

Moreover, in an embodiment, oscillator unit 406 retrieves the phase that it employed to make prior bit stuffing decisions from the current state of the DS1 channel. In one such embodiment, this retrieved phase is updated based on the input received from low pass filter unit 404 and used to make the bit stuffing decision. In an embodiment, oscillator unit 406 saves the updated value for the phase as part of the current state of the DS1 channel within the associated register array 314*a–i*.

DS3/DS2 framing unit 302 also determines if the instant timeslot is one in which a stuff decision is made, at process decision block 606. In one embodiment, this decision is made at least two timeslots prior to the timeslot for a given channel in which there is a bit stuff opportunity. However, embodiments of the present invention are not so limited. For example, in another embodiment, this decision may occur one timeslot prior to the timeslot associated with a bit stuff opportunity for the given channel. In an embodiment, the timeslot associated with updating of the stuffing information is the same as the timeslot for when the stuff decision is made. Upon determining that this timeslot for the given channel is the one where a stuff decision is made, DS3/DS2 framing unit 302 processes the stuffing decision through stuffing decision unit 401, at process block 608.

As illustrated, one digital circuit (i.e., stuffing decision unit 401) is able to make decisions for each for the different channels within the signal being transmitted out from physical connection circuitry 210 by making the bit stuffing decision prior to the bit stuffing opportunity and while the current state of the channel is being processed by other units within physical connection circuitry 210 (e.g., transmitting protocol processing unit 308). Accordingly, one digital circuit (i.e., stuffing decision unit 401) is able to determine whether to perform a bit stuffing operation for each of the DS1 signals being received into physical connection circuitry 210. In other words, a separate digital or analog circuit is not required for each incoming DS1 signal to smooth out the data rate (i.e., perform bit stuffing operations). In particular, a single digital circuit is able to smooth a large number of DS1 signals because the decision of whether to perform the bit stuffing operation for smoothing for a given DS1 signal occurs while that channel for the DS1 signal is being processed.

Returning to FIG. 6, DS3/DS2 framing unit 302 determines whether the timeslot is associated with a stuff opportunity, at process decision block 610. As is known in the art for a given TDM signal, certain timeslots within the signal allow for the insertion of bits into the signal. Upon determining that this timeslot is associated with a bit stuffing opportunity, DS3/DS2 framing unit 302 determines whether to perform the bit stuffing, at process decision block 612. In one embodiment, this decision is based on the output of stuffing decision unit 401. DS3/DS2 framing unit 302 sends a stuff bit, at process block 614, or sends a data bit from the FIFO for the given DS1 channel, at process block 618, depending on the stuffing decision. Upon determining that this timeslot is not associated with a bit stuffing opportunity, DS3/DS2 framing unit 302 transmits data or overhead bits, at process block 616.

The order of operations illustrated in FIG. 6 are by way of example and not by way of limitation. For example, in an embodiment, the depth of the FIFO measured at process block 604 can be performed a number of times, thereby allowing for an average value of the depth of the FIFO, which can be processed by low pass filter unit 404. In another embodiment, low pass filter unit 404 can update the FIFO depth each time the depth of the FIFO is measured. In one such embodiment, this processing can occur multiple times per stuffing decision. In an embodiment, the depth of the FIFO can be measured a number of times and can be processed by low pass filter unit 404 a number of times per stuffing decision. In one embodiment, the measurement of the FIFO depth, the processing by low pass filter unit 404 and a stuffing decision occur each time a timeslot is processed for a given channel.

As illustrated, in one embodiment, the decisions shown in FIG. 6 are made when the configuration and state of the given DS1 channel has been extracted from the associated register array 314, as described above. Therefore, while a given timeslot for the DS1 channel is being processed based on the current configuration and current state for the associated channel extracted from the associated register array 314, DS3/DS2 framing unit 302 can make the above-described bit-stuffing decisions.

Figure 7:
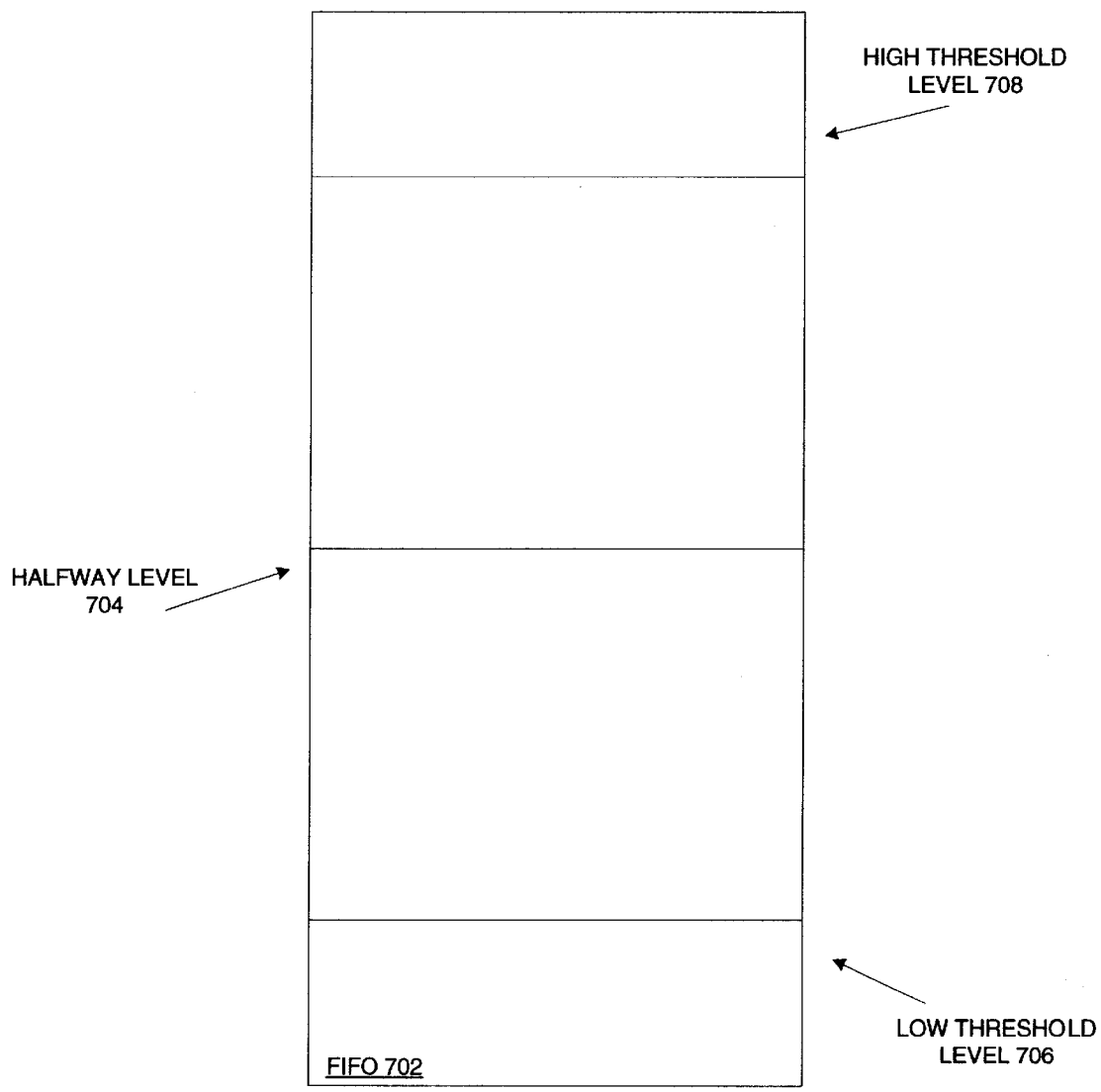
FIG. 7 includes a FIFO, according to embodiments of the present invention.

In another embodiment, stuffing decision unit 401 is not employed for making the stuffing decision. In contrast, data or stuffing bits are sent based on the level of bits of the DS1 signal contained in the associated FIFO. In particular, FIG. 7 includes a FIFO, according to embodiments of the present invention. In particular, FIG. 7 includes FIFO 702, which includes halfway level 704, low threshold level 706 and high threshold level 708. According to one embodiment of the present invention, low threshold level 706 and high threshold level 708 serves as indicators to override a decision made by stuffing decision unit 401. For example, assuming that FIFO 702 is employed for extraction of bits from a DS-1 channel being received, if the number of bits within FIFO 702 falls below low threshold level 706, the stuffing bits are placed into the new DS-1 signal, independent of any stuffing decision made by stuffing decision unit 401. Similarly, assuming that FIFO 702 is employed for extraction of bits from a DS-1 channel being received, if the number of bits within FIFO 702 exceeds high threshold level 708, the data bits within sent (with no bit stuffing), independent of any stuffing decision made by stuffing decision unit 401.

Returning to FIG. 5, in addition to processing the data in the given channel, transmitting protocol processing unit 308 places the processed data in the channel, at process block 512. Additionally, transmitting protocol processing unit 308, DS1 framing unit 350 and DS3/DS2 framing unit 302 store the current state as the previous state for the processed channel within register arrays 316*a–i*, at process block 514. As described above, the current state can include a number of different bytes depending on the type of protocol and protocol configuration. With regard to the data stored in the current state for stuffing decision unit 401, such data includes, but is not limited to, the number of bits in the FIFO, the values of the variables in generating the smoothed out value within low pass filter unit 404 and the phase of oscillator unit 406.

Embodiments of the present invention illustrate the data related to stuffing decision unit 401 being stored within register arrays 314*a–i*. However, embodiments of the present invention are not so limited, as this data can be stored in other locations for the different channels. For example, in another embodiment, a separate memory area internal and/or external to physical connection circuitry 210 could be employed for the storage of such data.

The line cards and control cards included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

A method and apparatus for performing bit stuffing operations for transmission signals have been described. Although the present invention has been described with reference to specific exemplary embodiments, it will be evident that various modifications and changes may be made to these embodiments without departing from the broader spirit and scope of the invention. For example, embodiments of the present invention generate computations related to the FIFO depth for a given channel for each stuffing bit decision. However, in another embodiment, the computations related to the FIFO depth could be generated each time the current state of the channel is taken from registers arrays 314*a–i*. In one embodiment, a separate unit, such as DS1 cross connect 354 may pull the current state of the channel for different computations. The FIFO depth for that given channel could also be computed during that stage. Moreover, in another embodiment, DS3/DS2 framer unit 302 could independently pull the current state of a channel to determine a FIFO depth for a given channel. Accordingly, the specification and drawings are to be regarded in an illustrative rather than a restrictive sense.

What is claimed is:

1. A method comprising:
   receiving data for a number of channels of a number of Time Division Multiplexing signals, the data for the number of channels stored in a number of first-in-first-out (FIFO) memories; and
   recursively performing the following for the number of channels in an order,
      updating bit stuffing information for the channel, in a time slot for the channel, based on an occupancy of the respective FIFO memory, upon determining that the time slot is associated with an update to the bit stuffing information; and
      performing a bit stuffing for the channel, in a different time slot for the channel, upon determining that the time slot is associated with the bit and the occupancy the respective FIFO memory is at a depth to transmit a stuff bit in place of a data bit from the respective FIFO memory.

2. The method of claim 1, wherein the order is sequential.

3. The method of claim 1, wherein the order is an order of timeslots from each channel within an outgoing multiplexed bitstream.

4. The method of claim 1, wherein the order is such that a first channel of the number of channels is processed more frequently than a second channel of the number of channels.

5. The method of claim 1, wherein the determining whether to make the bit stuffing is based on a current value and a history of values of a depth of the FIFO for the channel of the number of channels.

6. The method of claim 5, wherein the history of the values of the depth of the FIFO includes a weighted average of the depth of the FIFO.

7. The method of claim 1, wherein performing the following for the number of channels in an order comprises, determining whether to perform a bit stuffing for the channel, in a second different time slot for the channel, upon determining that the time slot is associated with a determination on whether to perform the bit stuffing.

8. The method of claim 1, wherein the order is sequential.

9. The method of claim 1, wherein the order is an order of timeslots from each channel within an outgoing multiplexed bitstream.

10. The method of claim 1, wherein the order is such that a first channel of the number of channels is processed more frequently than a second channel of the number of channels.

11. A method comprising:
receiving data for a number of channels of a signal;
recursively processing the data for the number of channels in an order, wherein the processing of a channel of the number of channels includes:
retrieving a previous state for the channel upon determining that a timeslot for the channel is being processed, wherein the previous state includes a history of values of a depth of a First In First Out (FIFO) for the channel;
processing the timeslot for the channel of the number of channels within the signal, wherein the processing includes:
determining whether to perform a bit stuffing for the channel upon determining that the timeslot for the channel is associated with a bit stuffing opportunity, wherein the determining whether to make the bit stuffing is based on a current value and the history of the values of the depth of the FIFO for the channel;
updating a current state for the channel of the number of channels; and
storing the current state for the channel of the number of channels within the signal as the previous state for the channel.

12. The method of claim 11, wherein updating the current state for the channel of the number of channels includes updating the history of the values of the depth of the FIFO for the channel upon determining that the timeslot for the channel is associated with an update of the history of the values of the depth of the FIFO for the channel.

13. The method of claim 12, wherein the timeslot associated with the bit stuffing opportunity is the timeslot associated with the update of the history of the values of the depth of the FIFO for the channel.

14. The method of claim 12, wherein the timeslot associated with the bit stuffing opportunity is not the timeslot associated with the update of the history of the values of the depth of the FIFO for the channel.

15. The method of claim 11, wherein the order is sequential.

16. The method of claim 11, wherein the order is such that data for a first channel of the number of channels is processed more frequently than data for a second channel of the number of channels.

17. The method of claim 11, wherein the signal includes a Data Signal (DS)-3 signal such that each channel is associated with a DS-1 signal.

18. The method of claim 11, wherein a single circuitry recursively processing the data for the number of channels in the order.

19. The method of claim 11, wherein the history of the values of the depth of the FIFO includes a weighted average of the depth of the FIFO.

20. An apparatus comprising:
a number of First In First Out (FIFO) memories, wherein each FIFO memory is associated with one of a number of channels for a signal;
a stuffing decision unit coupled to the number of FIFO memories, wherein the stuffing decision unit is to recursively process each of the number of channels for the signal in an order to update bit stuffing information for the channel, in a time slot for the channel, based on an occupancy of the respective FIFO memory, upon determining that the time slot is associated with an update to the bit stuffing information and, the stuffing decision unit is to perform a bit stuffing for the channel, in a different time slot for the channel, upon determining that the time slot is associated with the bit stuffing and the occupancy of the respective FIFO memory is at a depth to transmit a stuff bit in place of a data bit from the respective FIFO memory.

21. The apparatus of claim 20, wherein the order is sequential.

22. The apparatus of claim 20, wherein the order is such that a first channel of the number of channels is processed more frequently than a second channel of the number of channels.

23. The apparatus of claim 20, wherein the signal includes a Data Signal (DS)-3 signal such that each channel is associated with a DS-1 signal.

24. The apparatus of claim 20, wherein updating bit stuffing information for the channel, in the time slot for the channel, is based on a history of values of the depth of the respective FIFO memory.

25. The apparatus of claim 20, wherein the stuffing decision unit includes,
a frequency/phase detector unit to determine a depth of each of the number of FIFO memories;
a low pass filter unit coupled to the frequency/phase detector unit, the low pass filter unit to generate a smoothed value of the depth of each of the number of FIFO memories; and
an oscillator unit coupled to the low pass filter unit, the oscillator unit to output a value indicating whether to perform bit stuffing for each of the number of channels based on the smoothed value of the depth of the associated FIFO memory.

26. A machine-readable medium that provides instructions, which when executed by a machine, cause said machine to perform operations comprising:
receiving data for a number of channels of a number of Time Division Multiplexing signals, the data for the number of channels stored in a number of first-in-first-out (FIFO) memories; and
recursively performing the following for the number of channels in an order,
updating bit stuffing information for the channel, in a time slot for the channel, based on an occupancy of the respective FIFO memory, upon determining that the time slot is associated with an update to the bit stuffing information; and performing a bit stuffing for the channel, in a different time slot for the channel, upon determining that the time slot is associated with the bit stuffing and the occupancy of the respective FIFO memory is at a depth to transmit a stuff bit in place of a data bit from the respective FIFO memory.

27. The machine-readable medium of claim 26, wherein the order is sequential.

28. The machine-readable medium of claim 26, wherein the order is such that a first channel of the number of channels is processed more frequently than a second channel of the number of channels.

29. The machine-readable medium of claim 26, wherein the determining whether to make the bit stuffing is based on a current value and a history of values of a depth of the FIFO for the channel of the number of channels.

30. The machine-readable medium of claim 26, wherein the history of the values of the depth of the FIFO includes a weighted average of the depth of the FIFO.

31. A machine-readable medium that provides instructions, which when executed by a machine, cause said machine to perform operations comprising:
receiving data for a number of channels of a signal;
recursively processing the data for the number of channels in an order, wherein the processing of a channel of the number of channels includes:
retrieving a previous state for the channel upon determining that a timeslot for the channel is being processed, wherein the previous state includes a history of values of a depth of a First In First Out (FIFO) for the channel;
processing the timeslot for the channel of the number of channels within the signal, wherein the processing includes:
determining whether to perform a bit stuffing for the channel upon determining that the timeslot for the channel is associated with a bit stuffing opportunity, wherein the determining whether to make the bit stuffing is based on a current value and the history of the values of the depth of the FIFO for the channel;
updating a current state for the channel of the number of channels; and
storing the current state for the channel of the number of channels within the signal as the previous state for the channel.

32. The machine-readable medium of claim 31, wherein updating the current state for the channel of the number of channels includes updating the history of the values of the depth of the FIFO for the channel upon determining that the timeslot for the channel is associated with an update of the history of the values of the depth of the FIFO for the channel.

33. The machine-readable medium of claim 32, wherein the timeslot associated with the bit stuffing opportunity is the timeslot associated with the update of the history of the values of the depth of the FIFO for the channel.

34. The machine-readable medium of claim 32, wherein the timeslot associated with the bit stuffing opportunity is not the timeslot associated with the update of the history of the values of the depth of the FIFO for the channel.

35. The machine-readable medium of claim 31, wherein the order is sequential.

36. The machine-readable medium of claim 31, wherein the order is such that data for a first channel of the number of channels is processed more frequently than data for a second channel of the number of channels.

37. The machine-readable medium of claim 31, wherein the signal includes a Data Signal (DS)-3 signal such that each channel is associated with a DS-1 signal.

38. The machine-readable medium of claim 31, wherein a single circuitry recursively processing the data for the number of channels in the order.

39. The machine-readable medium of claim 31, wherein the history of the values of the depth of the FIFO includes a weighted average of the depth of the FIFO.

40. A method comprising:
receiving data for a number of channels of a Time Division Multiplexing (TDM) signal, the data for the number of channels stored in a number of first-in-first-out (FIFO) memories; and
recursively performing the following for a time slot for each of the number of channels in an order using a single circuitry,
updating bit stuffing information for the channel based on a depth of the respective FIFO memory, upon determining that the time slot is associated with an update to the bit stuffing information;
determining whether to perform a bit stuffing for the channel, upon determining that the time slot is associated with a determination on whether to perform the bit
performing a bit stuffing for the channel, upon determining that the time slot is associated with the bit stuffing.

41. The method of claim 40, wherein the updating of the bit stuffing information, the determining whether to perform the bit stuffing and performing a bit stuffing for the channel are processed in different timeslots of the channel.

* * * * *